INVENTOR.
ALBERT J. GRANBERG
BY
Bruce & Brosler
HIS ATTORNEYS

Dec. 21, 1965  A. J. GRANBERG  3,224,273
BASIC LIQUID METER AND INTERCHANGEABLE
COMPENSATING MEANS THEREFOR
Filed Feb. 26, 1962  7 Sheets-Sheet 2

INVENTOR.
ALBERT J. GRANBERG
BY
Bruce & Brosler
HIS ATTORNEYS

INVENTOR.
ALBERT J. GRANBERG
BY
Bruce & Brosler
HIS ATTORNEYS

INVENTOR.
ALBERT J. GRANBERG
BY
Bruce & Brooler
HIS ATTORNEYS

INVENTOR.
ALBERT J. GRANBERG
BY
Bruce & Brosler
HIS ATTORNEYS

INVENTOR.
ALBERT J. GRANBERG
BY
*Bruce & Brosler*
HIS ATTORNEYS

Dec. 21, 1965  A. J. GRANBERG  3,224,273
BASIC LIQUID METER AND INTERCHANGEABLE
COMPENSATING MEANS THEREFOR
Filed Feb. 26, 1962
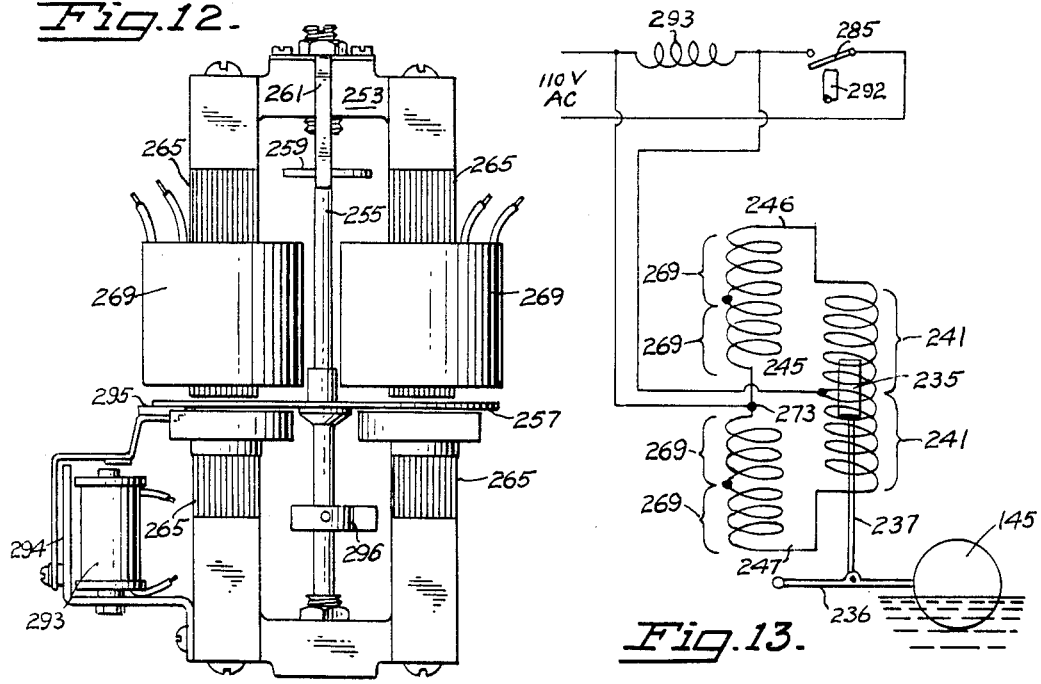
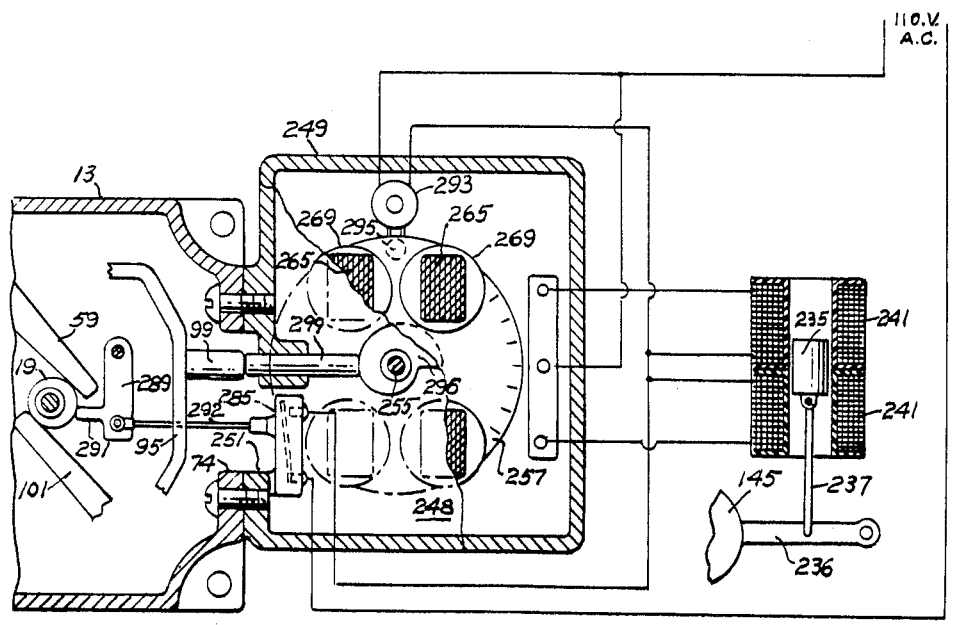
INVENTOR.
ALBERT J. GRANBERG
BY
Bruce & Brusler
HIS ATTORNEYS United States Patent Office 3,224,273
Patented Dec. 21, 1965

3,224,273
BASIC LIQUID METER AND INTERCHANGEABLE COMPENSATING MEANS THEREFOR
Albert J. Granberg, Oakland, Calif., assignor to Cal-Meter Co., Emeryville, Calif., a corporation of California
Filed Feb. 26, 1962, Ser. No. 175,519
12 Claims. (Cl. 73—233)

This invention relates to liquid meters and more particularly to those of the positive displacement type having a rotating shaft connected to a register or counter, with means for compensating or modifying the latter automatically according to changes in a physical condition of the liquid handled.

Ordinarily liquid meters are calibrated to measure liquid flow in terms of volume, such as gallons or cubic feet. In many recent meter applications it has become desirable to indicate or record liquid flow in terms of weight. This is particularly true in connection with large aircraft, jets, and missiles where fuel load is based on the calculated consumption of fuel for a given trip in terms of pounds of fuel per hour of flight, so as not to overload the aircraft or missile on takeoff and yet assure that it will carry the required amount for the purpose intended.

Furthermore, the widely varying temperature encountered in fueling and in flight have a marked effect on the fuels themselves, due to their relatively large temperature coefficients of expansion, so that volume and density changes of considerable magnitude must be considered.

In addition, there is a wide range of density in the fuels designed for particular types of engines and other propulsion units. These may range from 32 A.P.I. to 60 A.P.I., so that the design and calibration of liquid meters used for handling different grades of fuel at a given field installation becomes complex and expensive.

This invention comprehends generally an improved basic meter adapted to receive interchangeable compensating means for installation between the meter output shaft and the integrating or indicating counter or register normally associated with a meter as a component part thereof.

Among the objects and advantages of the invention are:
(1) To provide a novel and improved liquid meter assembly;
(2) To provide a novel and improved liquid meter assembly capable of measuring liquid flow in terms of weight of liquid, and which may interchangeably be altered to compensate for different physical characteristics of the liquids to be metered;
(3) To provide a novel and improved liquid meter compensating means which will afford simple adjustments for calibration and standardization, as well as automatic modifications of the registered amounts with changes in fuel temperature, fuel density or combinations of these values;
(4) To provide a novel and improved liquid meter arrangement for measuring liquid flow in terms of weight of liquid, which will correctly and automatically compensate for changes in physical properties of the liquid;
(5) To provide novel and improved compensating means for modifying the drive ratio between the displacement metering means and the register therefor; and
(6) To provide a novel and improved position-controlled compensating means that will be adapted for interchanging various types of properties-responsive means depending upon the specific liquids that are to be metered.

These and other objects and advantages will be further apparent from the following description of a preferred embodiment, together with alternative forms, taken in conjunction with the accompanying drawings, wherein:

FIGURE 11 is a horizontal sectional view through the double motor receiving element on the compensator housing of FIGURE 1 to receive the position signal from the transmitter of FIGURE 10;

FIGURE 12 is a view in elevation of the mechanism involved in the housing of FIGURE 11;

FIGURE 13 is a circuit diagram of the signal system involving the apparatus of FIGURES 10, 11 and 12.

Figure 1:
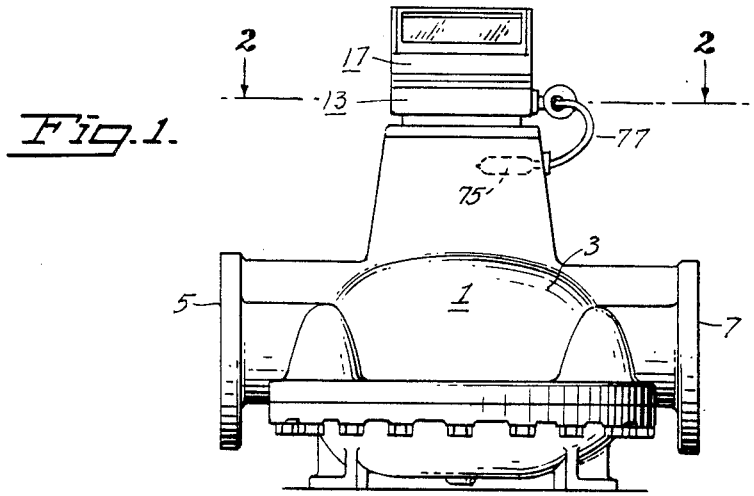
FIGURE 1 is a vertical elevational view of a liquid meter to which the present invention is applicable.
Figure 7:
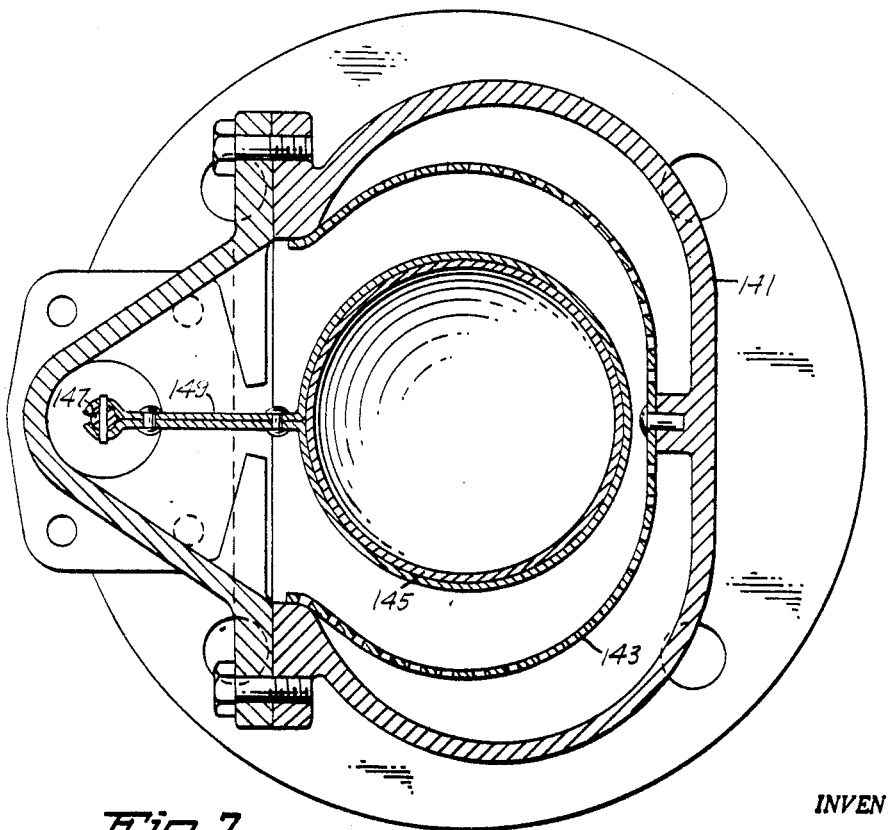
FIGURE 7 is a vertical cross-sectional view of the float chamber of FIGURE 6 taken on line 7—7.

Referring to the drawings, and particularly to FIGURE 1, the invention has been illustrated as applicable to a meter 1 of the positive displacement type. Such a meter generally involves a casing 3 having a liquid inlet 5, a liquid outlet 7, and a rotatable assembly (not illustrated) defining a plurality of compartments and constituting the rotatable component of the meter.

This rotatable component includes a meter driven shaft 9 which extends upwardly through a top plate 11 to which is secured the housing 13 for use in conjunction with the interchangeable compensating and adjusting means to be described and which constitute a principal feature of this invention.

Above the housing 13 and connected to the last-named means by shaft 15, is a rotatable counting means or register 17, which serves to record the quantity of liquid flowing through the meter. This may be of any desired type.

Figure 2:
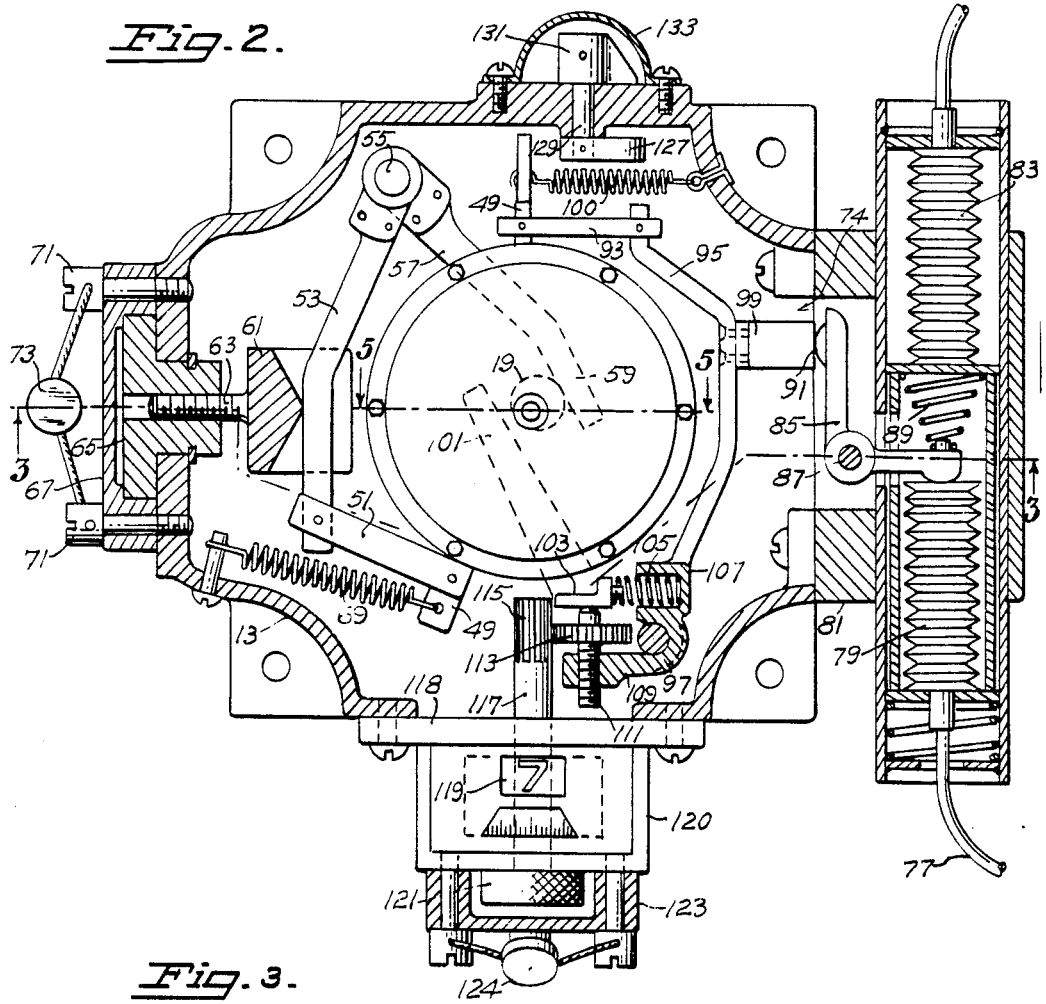
FIGURE 2 is a horizontal sectional view of the meter adjusting or compensator mechanism, taken on line 2—2 of FIGURE 1.
Figure 3:
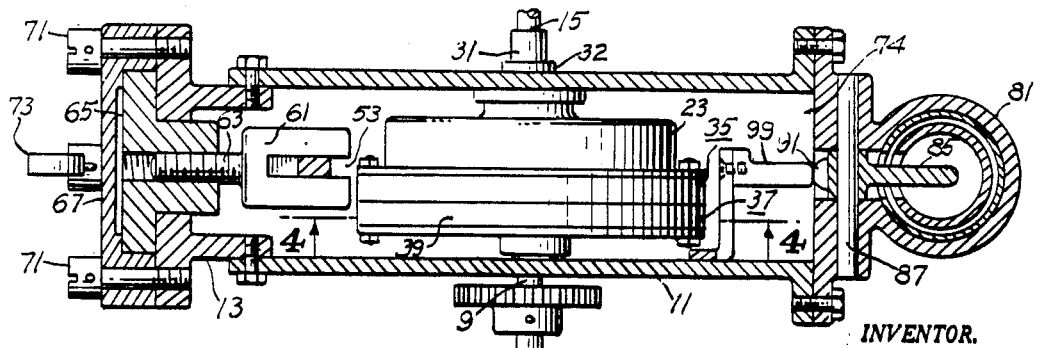
FIGURE 3 is a vertical and part sectional view of the meter compensator mechanism taken on line 3—3 of FIGURE 2.
Figure 4:
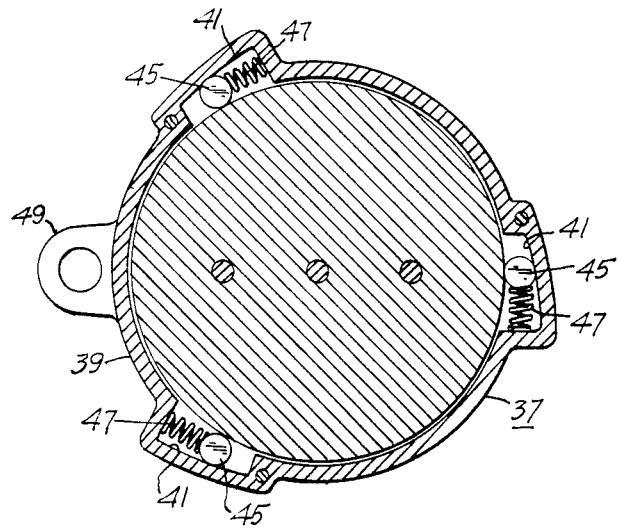
FIGURE 4 is a horizontal sectional view of one of the two overriding clutches used in the meter rotation transmission element, taken on line 4—4 of FIGURE 3. Because these are mounted in opposed position, the other clutch is made opposite hand but otherwise is identical.

Referring now to FIGURES 2, 3 and 4, there are illustrated in these figures, details of the basic meter adjusting means, plus compensating means, particularly the preferred means for compensating the indication of the register 17 for changes or variations in temperature of the liquid passing through the meter 1. Essentially this alters the effective speed ratio between shafts 9 and 15 to introduce either or both of two factors, viz., a first factor that may be termed an adjusting or calibrating factor, e.g. to take care of tolerances in manufacturing and subsequent meter wear, etc., and a second factor that is cumulative and controlled by the actual temperature of the liquid being handled. Thus the counter will record accurately the volume of liquid in terms of what it would be at a standard or reference temperature, for example 60 degrees Fahrenheit, as is required in certain circumstances, when handling petroleum hydrocarbons.

Figure 5:
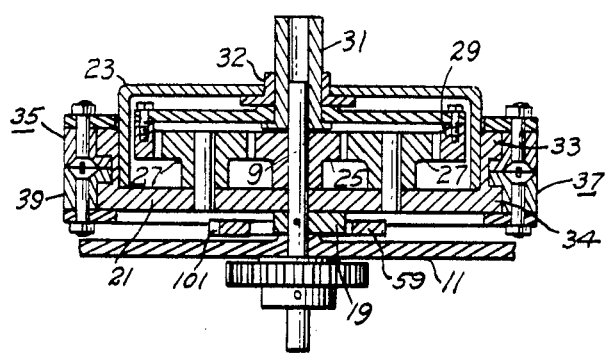
FIGURE 5 is a detailed vertical sectional view of the transmission element taken on line 5—5 of FIGURE 2.
Figure 6:
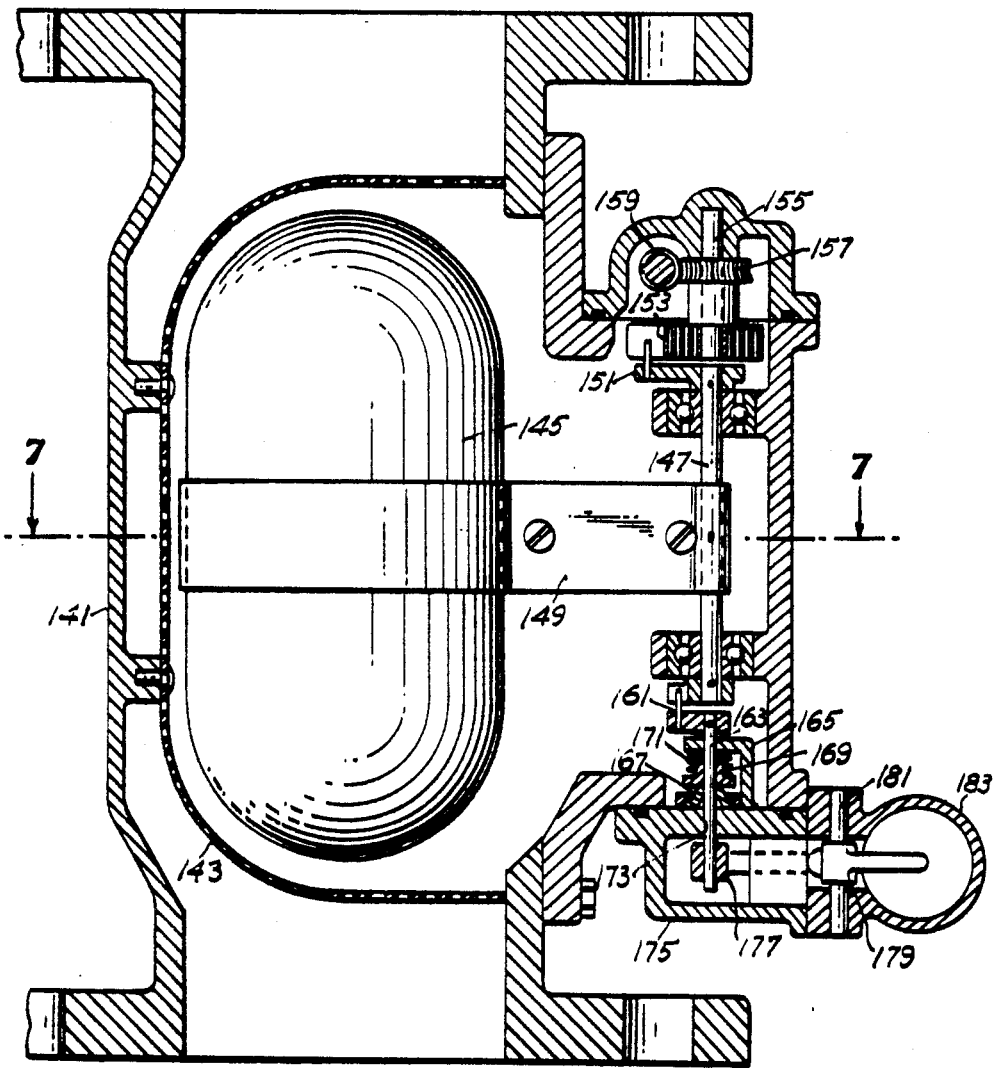
FIGURE 6 is a horizontal sectional view taken through a gravity responsive float chamber placed in the liquid-conveying line communicating with the displacement meter of FIGURE 1, and utilizing a fluid transmission to the compensating mechanism of FIGURES 2 and 3.

Referring now to FIGURE 5, there is illustrated the top plate 11 of meter 1 through which meter driven shaft 9 projects upwardly into the meter adjustment and compensator means. A single lobed cam 19 is secured to the shaft below a plate 21, the latter constituting the base plate of a housing 23 for a conventional geared planetary transmission, comprising a sun wheel 25, a plurality of planet wheels 27, and an enclosing ring gear 29, the latter carrying a hollow shaft 31 journalled in a bushing 32 in the top of transmission housing 23 and projecting upwardly through said bushing.

Compensator output shaft 15, previously mentioned, is keyed, splined or otherwise fixed into the top of hollow shaft 31 and projects upwardly to actuate the meter register 17.

Planetary gear housing 23 is provided with two encircling rings the one 33 above the other 34. The upper ring 33 is surrounded by an upper overriding clutch 35 and the lower ring 34 with a lower overriding clutch 37. A plan view of lower clutch element 37 is shown in FIGURE 4. It may be of any usual type, in this example, comprising a clutch ring 39 having three circumferentially spaced wedge shaped pockets 41, in each of which, a ball 45 is urged toward the narrow end by a spring 47 to clutch the proximate ring 39, in the absence of other factors. A control arm 49 extending radially from each clutch ring, can be utilized to either retain the clutch stationary, or to impart thereto intermittent movement relative to the housing 23, under the influence of cam 19, by means which will be described below. Because the clutches are opposed, one facing up and the other down, they must be opposite hand.

The lower or meter adjusting clutch 37 is connected through a floating link 51 to a first horizontal arm 53 journalled on a stationary pin 55 extending upwardly in housing 13. A second arm 57, also journalled on pin 55, is secured to 53 to form a bell crank, and terminates in a horizontal cam follower 59 which extends horizontally beneath planetary gear housing 23 and is adapted to engage and ride the cam 19 on shaft 9.

Intermediate the ends of first arm 53, is a movable stop member 61 carried by a pin 63 threaded into an adjusting knob 65 in the wall of housing 13 and normally covered by a removable seal cap 67. A spring 69 anchored at one end to the control arm 49 and at its other end to a fixed point on the housing 13, resiliently urges arm 53 against stop 61.

When meter shaft 9 rotates, cam 19 will deflect follower 59 periodically in a counterclockwise direction about pin 55 to an extent permitted by the position of adjusting knob 65 and stop member 61. The adjustable stop means thus controls the angle of movement of the gear housing per each rotation of the cam. This counterclockwise impulse will be transmitted through first arm 53 and line 51 to lower clutch 37, to advance the latter and give a counterclockwise impulse to the normally stationary planetary gear housing 23. The adjustable stop means thus controls the angle of movement of the gear housing by clutch 37 per each rotation. This will, in turn, impart a comparable advance in counterclockwise rotation to the output shaft 15, in addition to the normal action of the planetary transmission gears.

Thus, if the meter register 17 is deliberately geared to meter driven shaft 9 so as to indicate 2% below the actual meter output, and the proportions of cam 19 and its associated linkage to clutch 37 can be modified by adjusting knob and stop 61 to give a total of 4% advance to the planetary transmission and output shaft 15, a positive and negative range of adjustment of 2% is possible. To insure against unauthorized adjustments or tampering, seal cap 67 is affixed with studs 71 and a lead seal means 73 as shown.

Upper overriding clutch 35 is similar in construction to the lower clutch 37 already described. It is adapted to impart an incremental intermittent rotation impulse to planetary gear housing 23 and ultimately to register 17 by any one of a variety of possible compensating means which are made to respond to some change in the liquid being metered, to compensate the meter for such change. For this purpose, the housing 13 of the basic meter is formed with a flanged opening 74 for the mounting of any such compensating means, whereby the same may be coupled through the opening to the upper overriding clutch 35 to effect compensation of the meter.

One such compensating means may be made responsive to change in temperature of the liquid with respect to a reference temperature, and is applicable to liquids like gasoline whose specific gravity at a given temperature is quite constant.

For this purpose, a temperature sensing capsule 75 filled with a suitable volatile liquid such as alcohol or benzene, is placed in the casing 3, and is connected by a small diameter tube 77 to a first Sylphon bellows 79 in an actuator housing 81, which is detachably secured to the compensator housing 13 about the opening 74. Opposed to bellows 79 is a second or balancing bellows 83, also filled with a volatile liquid, to compensate for the changes in ambient atmospheric temperature and pressure.

Increase or decrease in the liquid temperature above or below the desired reference temperature, will cause changes in pressure within the sensing capsule 75 that will be transmitted through tube 77 to bellows 79 and change its length. This latter will be detected by a bell crank 85 journalled on a vertical pin 87 in actuator housing 81, and resiliently coupled to balancing bellows 83 by an intermediately disposed compression spring 89. Pin 87 and an arcuately faced boss 91 on the inner face of crank 85 are accurately located and positioned with respect to the inner face of actuator housing 81, where it contacts compensator housing 13, for a purpose which will be described in detail below.

Upper clutch 35 is connected through a floating link 93 to a crank arm 95 journalled on a vertical pin 97 in housing 13. A smooth-faced stud 99 extends outwardly to be engaged by the boss 91 of the temperature-responsive system just described, under action of a spring 100 anchored under tension between the associated control arm 49 and a point on the wall of housing 13, whereby the temperature in the metered liquid will control the distance that arm 95 will be permitted to move in a clockwise direction about vertical pin 97. Responsive to such movement of the arm 95, is a cam follower 101, whose relationship to the cam 19 is altered to effect a change in angular movement of the gear housing per each rotation of the cam 19.

Now it is well known that certain liquids, such as petroleum hydrocarbons of different density or specific gravity will have different temperature-volume relationships. The displacement meter 1 is insensitive to such factors, so that an added correction must be imparted. In this example, such correction is made by modifying the angularity between crank arm 95 and its cam follower 101, which is independently journalled on pin 97. An upstanding spring anchor bracket 103 or cam follower 101 is resiliently urged counterclockwise with respect to crank arm 95 by spring 105 in retainer cup 107 on the latter arm. A tangential bracket 109 forming an appendage to arm 95 supports a threaded shaft 111 carrying a gear 113, the end of the shaft bearing against bracket 103.

Rotation of the shaft 111 by means of a pinion 115 carried by an adjusting shaft 117 and engaging gear 113, will change the angularity of crank arm 95 with respect to cam follower 101, and will modify the periodic counterclockwise deflection by the latter by the rotating cam 19 on the meter driven shaft 9.

Desirably, the shaft 117 is journalled in a plate 118 covering an opening in the side wall of compensator housing 13, and beyond such plate the shaft 117 is provided with a visible scale 119, preferably calibrated in density, such as degrees A.P.I. and enclosed within a windowed housing 120. An adjusting knob 121 for shaft 111 and exposed beyond the end of the scale housing 120, may also be provided with a seal cap 123 and seal 124 as shown.

It will be noted that cam followers 59 and 101 must be so related to cam 19 that they will be successively and not simultaneously actuated by its rotation, so that the clutches will both act to increase by the desired amount the ratio of rotation between meter driven shaft 9 and compensator output shaft 15. Thus, the cam forms a functionally cooperating means between the several compensations, first, the arbitrary one controlled by knob 65 and which adjusts the basic meter, and second, the one due to temperature-gravity factors controlled jointly by temperature sensing capsule 75 and specific gravity-adjusting knob 121 or other means.

Desirably, means are provided for disengaging the temperature-responsive element just described, for certain calibration procedures. This may be done by extending the control arm 49 of upper overriding clutch 35 beyond the spring 100, so that the arm 49 may be engaged by a cam arm 127 on shaft 129 under control of an external knob 131 normally covered by a detachable seal cap 133. When the cam 127 is turned to engage the outer end of control arm 49 of clutch 35, it will be forced in a counterclockwise direction, and will accordingly move the cam follower 101 further from the cam 19, and stud 99 from contacting boss 91.

In the event that a gravity compensator is to be substituted for the temperature compensating means just described, as will be necessary when metering liquids such as crude oil or rocket fuel, where specific gravities are not constant, a float chamber 141 is connected in the conduit that conveys the liquid to or from meter 1. Within the chamber is a perforated guard 143 to provide continuous access of liquid to float 145 without affecting its position therein. A horizontal shaft 147, journalled in the chamber, is connected to float 145 by an arm 149, and is rotated thereby throughout a partial revolution depending upon changes in the density or gravity of the liquid in the chamber. At one end of shaft 147 is a pin clutch 151, engaging a spiral spring 153 on a stub shaft 155 having a worm gear 157 engaging a worm 159. The latter is rotatable from the outside of the chamber for compensating the weight of the arm 149 and float 145.

In order to transmit the motion of float 145 out of chamber 141 and to the compensator housing 13 and its associated mechanism, the opposite end of shaft 147 is connected by a second pin clutch 161 to a second coaxial shaft 163, journalled in a bracket 165 and provided with a low-friction pressure seal of the type used generally in fluid metering. In this example, it comprises a resilient hollow cone 167 having a gland follower 169 confined by a helical spring 171, all surrounding the shaft at the point where it passes through a bore 173 in a crank housing 175. The outer end of shaft 163 is connected by a crank and link 177 to a bell crank 179 rotatable on a pin 181 to engage one end of a Sylphon bellows transmitter element 183. The latter is connected by the usual tubing to the first Sylphon bellows 79 of the arrangement of FIGURE 2.

Figure 8:
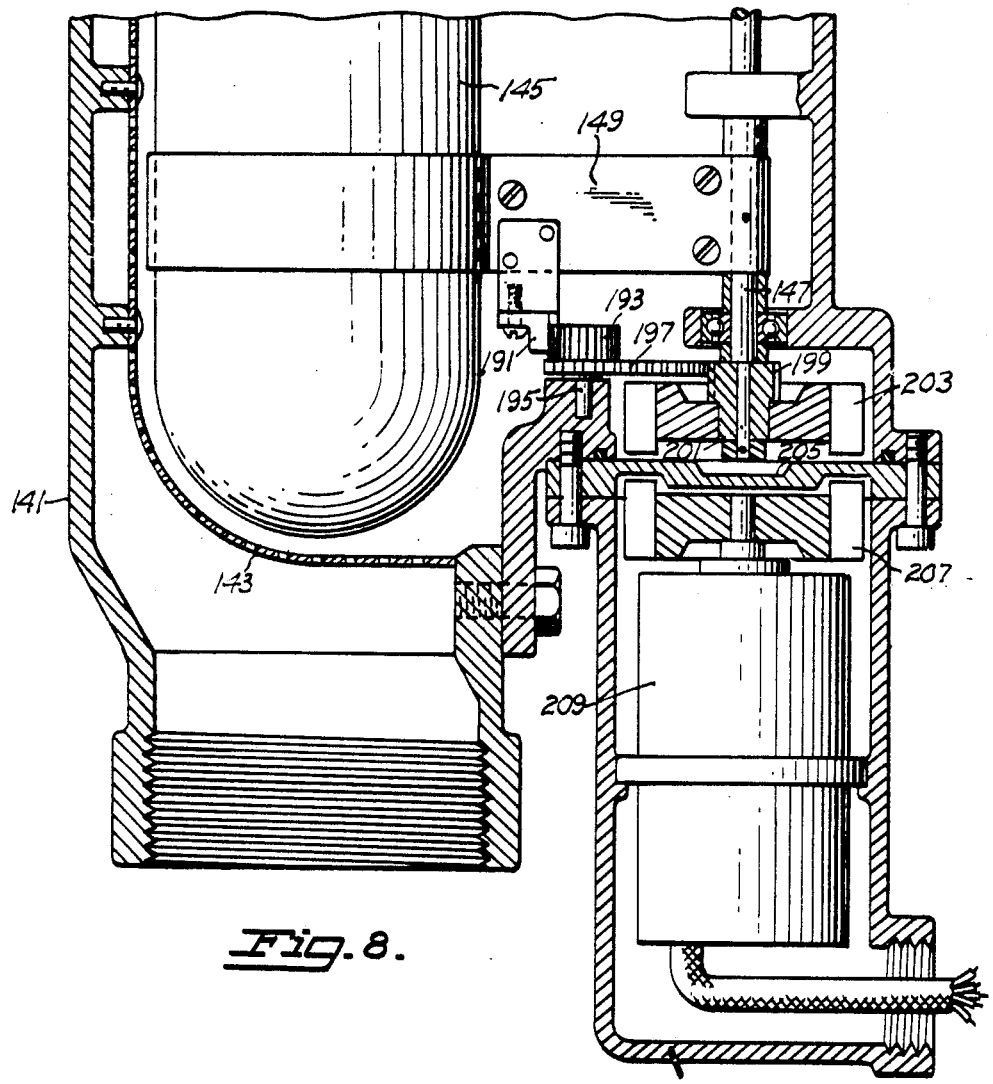
FIGURE 8 is a horizontal sectional view through a gravity-responsive float chamber similar to FIGURE 6 but with a synchronous motor position transmission element.

An alternative motion transmitter for horizontal float shaft 147 to the one just described, and particularly adapted for very high liquid pressures, is shown in FIGURE 8. It comprises a slightly curved rack 191 secured to float arm 149 and engaging a pinion 193 journalled on a stub shaft 195 in the wall of chamber 141 and secured to a sector gear 197. The latter meshes with a pinion 199 independently rotatable on a small diameter extension 201 of shaft 147 and carrying a position transmitting permanent magnet 203. The external field of this magnet acts through the non-magnetic closure plate or diaphragm 205, sealing the float housing, upon a similar magnet 207 secured to the shaft of a conventional electrical synchronous motor position transmitter 209.

Figure 9:
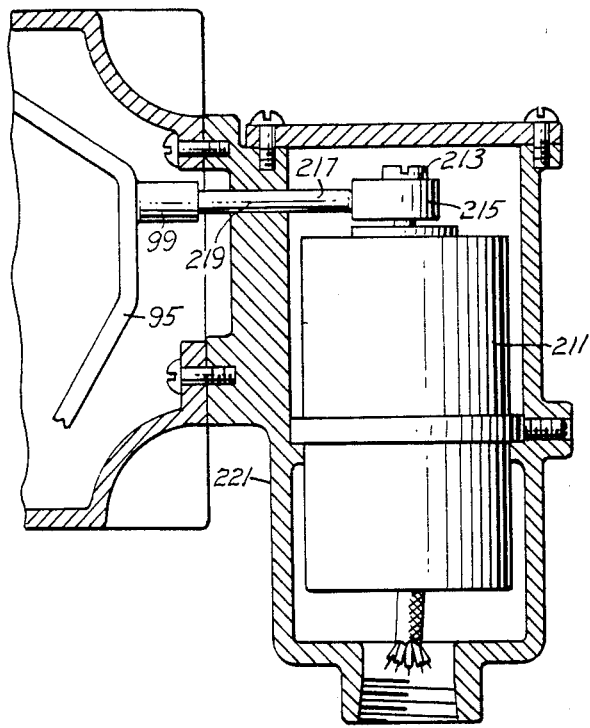
FIGURE 9 is a horizontal sectional view through the synchronous motor receiving element on the compensator housing of FIGURE 1 to receive the position signal from the transmitter of FIGURE 8.

This latter is electrically actuated from a suitable A.C. source (not illustrated) and transmits a signal to a synchronous receiving element 211 shown in FIGURE 9. In that figure, the rotatable position output shaft 213 of the receiving element, carries a cam 215 acting upon a straight cam follower or pushrod 217 passing through bore 219 in the housing 221 to engage the end of stud 99 on crank arm 95 (FIGURE 2). The configuration of the cam, as in the case of the previously described embodiments, is so proportioned as to impart the desired deflection to the arm 95 and give the necessary correction to the register 17.

Figure 10:
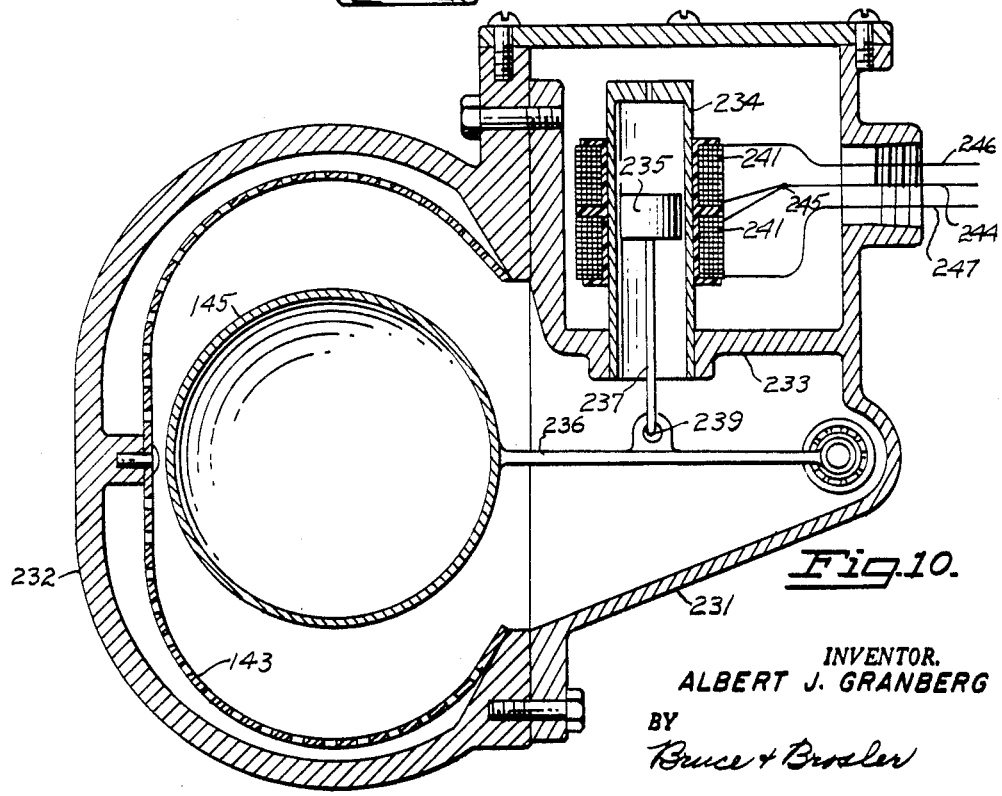
FIGURE 10 is a vertical sectional view of another form of gravity-responsive float chamber utilizing a double wound balancing transformer and an armature position-transmitter.

Another alternative for control for specific gravity compensation is shown in FIGURE 10. This embodiment provides a housing 231 secured to one side of a float chamber 232, said housing 231 supporting therein a partition 233 in which is mounted a cylindrical tube 234 of plastic or other non-magnetic material, to receive an armature 235 of magnetic material, movable upwardly and downwardly by a float arm 236, and a rod 237 pivoted at one end to the float arm at 239 and at its other end, connected to the armature.

Encircling the tube 234 are a pair of like windings 241 adjacently disposed with respect to each other. For the half way value of specific gravity, in the range to be covered by the meter, the length of rod 237 is such as to place the armature in a neutral position with respect to these windings, such position being depicted in FIGURE 10 of the drawings.

With both windings electrically energized to the same degree, the armature in its neutral position will maintain a balance of flux and current between the windings. Any movement of the armature from its neutral position, however, will unbalance such condition and increase the impedance of the one winding into which it moves while decreasing that of the other, with a resulting unbalance in voltages across these windings. These windings can therefore constitute a source of signals, indicative of a change in specific gravity of a liquid, when the armature can be made to respond to movements of a float as in the arrangement of FIGURE 10.

For connection of these windings 241 into a signal circuit, the windings may be serially joined, with a lead 244 from the joining connection or common terminal 245 and a separate lead 246 or 247 from the free end of each of the windings.

To utilize such signals in affecting a compensation in the liquid meter, I provide an assembly 248 (FIGURE 11) involving an assembly housing 249 adapted for mounting to the meter housing 13 across the opening 74, the assembly housing itself having an opening 251 for registry with that of the meter housing.

Within the assembly housing is a C-shaped yoke frame 253 of non-magnetic material such as brass or bronze, opposing ends of the yoke providing aligned bearings for rotatably supporting a shaft 255 on which is affixed a disc 257 of non-magnetic material such as aluminum. The disc is, in the absence of other factors, stabilized to a neutral position by a spiral hair spring 259, one end of which is fixed to the shaft and the other end to the free end of a hanging bracket 261 anchored to the proximate bearing area of the yoke. This position of the disc, for reference purposes, may be indicated by any suitable reference marking thereon, though this is not essential to its function.

To either side of the shaft mounting bearings, a laminated core section 265, of magnetic material is affixed to each of the opposed ends of the yoke, with the legs of the core sections affixed to one end of the yoke, being of sufficient length to mount magnet windings 269. Opposing core sections preferably terminate in proximity to the disc 257, leaving just sufficient gap within which the disc may freely rotate.

Each pair of windings of a core section are connected in series-aiding relationship, and the two pairs are electrically connected by a joining connection 273 from a terminal lead of one pair to a terminal lead of the other pair, the windings of one pair being in electrical opposition to those of the other pair in their effect on the disc when these windings are electrically energized.

With the free ends of these pairs of windings connected to the free ends of the windings 241, as by the leads 246, 247 and by connecting a source of power to such windings at the joining connections 245 and 273, it will readily become apparent that any unbalance occurring at the float end of the system will immediately produce an unbalance between the pairs of windings at the meter end of the system, to bring about an angular rotation of the aluminum disc 257 in one direction or the other, depending upon the direction of unbalance, and to an extent, depending upon the degree of unbalance created.

However, it is characteristic of an armature such as the armature 235, to move all the way to a position of stability within one winding or the other, once an unbalanced condition has been initiated. This, if permitted, would not only cause the armature to tend to take over control of the float, but such action of the armature, if permitted, would transmit to the meter end of the system only the maximum signal in either the plus or minus direction, and thus specific gravity indications within the range of liquids to be handled by the meter, will not be transmitted. Accordingly, to develop and transmit signals from the float end of the system to the meter end, which signals will accurately reflect specific gravity of a liquid flowing through a pipe line to the meter, the float must be free to seek its own level in the liquid, substantially, uninfluenced by the actions of the armature.

With this in mind, a micro-switch 285 is connected in one of the power leads to the windings and caused to make and break the circuit at a frequency, such that the inertia of the armature and float assembly can not be overcome, thus leaving the armature unaffected by the current flowing through the windings.

To accomplish such function of the switch, the same is mounted in the assembly housing in view of or in line with the meter cam 19 through the aligned openings 74 and 251 in such housing. The operations of the micro-switch are made responsive to the rotations of this cam, by pivotally anchoring a small lever 289 at one end, to the floor of the compensating chamber of the meter, with its free end provided with a cam follower 291 adapted to ride the cam surface and cause periodic actuation of the micro-switch through an actuating rod 292 coupling the free end of the lever to the spring terminal of the switch, the cam follower being held in engagement with the surface of the cam by the spring terminal of the switch.

During such intermittent energization of the windings of the circuit, it is to be noted that the spring 259 is continually exerting a torque on the shaft 255 in the direction of restoring the disc 257 to its neutral position and thereby produce inaccurate compensation of the meter. To preclude this from happening, I connect in parallel with the windings, a solenoid winding 293 having an associated armature 294 on which is mounted a braking pad 295 normally bearing against the disc 257 with sufficient pressure to overcome the action of spring 259. During intermittent energization of the solenoid, the brake is removed and the disc is free to move.

To compensate the meter in accordance with the compensating signals transmitted thereto from the windings 241, an appropriate cam 296 is mounted on the disc shaft 255, the rotative position of such cam being determined in accordance with the angle of swing of the disc and the direction of such swing. This is translated into corresponding adjustments of the crank arm 95 in the meter by a rod 299 slidably mounted in the assembly housing 249 and bridging the distance between the surface of the cam 295 and the stud 99 in the meter, whereby changes in the position of the cam 295 will be reflected in changes of the crank arm 95, which in turn, will correspondingly alter the compensation of the meter.

It will be apparent from the foregoing description of the embodiment of the invention as depicted in FIGURES 10, 11, 12 and 13 of the drawings, that changes in specific gravity of liquid being metered, will result in the meter being compensated accordingly, whereby the accuracy of the meter may be maintained despite changes in specific gravity of such liquid.

In all of the embodiments of this invention, it will be noted that one fundamental and essential positioning and registering relationship has remained unaltered, viz., the face and deflection of stud 99 on crank arm 95, and its relation to the mating faces of the compensator and actuator housings and their motion transmitting means.

Each one of the several forms of physical property compensating means acts in the same manner, direction and throughout the same distance on that stud face, so that a single size and arrangement of compensator housing may be utilized. This is a design, fabrication and utilization factor of substantial importance and renders the displacement meters of the rotary type usable in the newer applications where different kinds of liquids, and notably jet and missile fuels, are to be accurately dispensed and measured as pointed out in the introduction.

Although several alternative forms of liquid properties responsive means have been illustrated, they all functionally cooperate in the same manner with the compensating means comprising upper clutch 35, arm 49, link 93, crank arm 95, stud 99 and cam follower 101 to be actuated periodically by cam 19, and introduce the desired correction to the rotation of shaft 15 and register 17.

While I have illustrated and described the same in considerable detail, I do not desire to be limited in my protection to the details illustrated and described except as may be necessitated by the appended claims.

I claim:
1. A compensated liquid meter including
a basic meter having a casing, a rotatable shaft and a register,
and compensating means therefor,
said conpensating means comprising a planetary transmission connecting said shaft to said register,
said transmission including a normally stationary gear housing,
means for angularly rotating said gear housing intermittently to modify the indication of said register,
said last means including a clutch selectively engaging said planetary transmission gear housing,
means for intermittently actuating said clutch,
said means including a cam follower coupled to said clutch,
a cam driven by said rotatable shaft and adapted to successively actuate said cam follower,
and manually adjustable means for altering the angle of movement of said gear housing by said clutch per each rotation of said cam to effect adjustment of the basic meter.

2. A compensated liquid meter including
a basic meter having a casing, a rotational shaft and a register,
and compensating means therefor,
said compensating means comprising a planetary transmission connecting said shaft to said register,
said transmission including a gear housing capable of rotation to alter the speed ratio thereof,
means for angularly rotating said gear housing intermittently to establish a speed ratio for said transmission,
and means responsive to changes in a condition of liquid flowing through said meter, for altering the speed ratio of said transmission in accordance with such changes.

3. A compensated liquid meter including
a basic meter having a casing, a rotatable shaft and a register,
and compensating means therefor,
said compensating means comprising a planetary transmission connecting said shaft to said register,
said transmission including a gear housing capable of rotation to alter the speed ratio thereof,
means for angularly rotating said gear housing intermittently to establish a speed ratio for said transmission,
said last means including a clutch selectively engaging said planetary transmission gear housing, and
means for intermittently actuating said clutch,
and means responsive to changes in a condition of liquid flowing through said meter, for altering the angle of movement of said gear housing per each rotation of said angularly rotating means.

4. A compensated liquid meter including
a basic meter having a casing, a rotatable shaft and a register,
and compensating means therefor,
said compensating means comprising a planetary transmission connecting said shaft to said register,
said transmission including a gear housing capable of rotation to alter the speed ratio thereof, and
means for angularly rotating said gear housing intermittently to establish a speed ratio for said transmission,
said last means including a clutch selectively engaging said planetary transmission gear housing, and
means for intermittently actuating said clutch,
said means including a cam follower coupled to said clutch,
and a cam driven by said rotatable shaft and adapted to successively actuate said cam follower,
and means responsive to changes in a condition of liquid flowing through said meter, for altering the angle of movement of said gear housing per each rotation of said cam,
said means being adapted to adjust the cam follower of said clutch in accordance with changes in such liquid.

5. A compensated liquid meter including
a basic meter having a casing, a rotatable shaft and a register,
and compensating means therefor,
said compensating means comprising an adjustable transmission connecting said shaft to said register,
said transmission including a normally stationary gear housing, means for angularly rotating said gear housing intermittently to modify the indication of said register,
said last means including a first clutch selectively engaging said planetary transmission gear housing,
a second clutch selectively engaging said planetary gear housing,
a first means for intermittently actuating said transmission,
a second means for intermittently actuating said transmission between actuations of said transmission by said first means,
manually adjustable means for altering said first actuating means to change the speed ratio of said transmission and accordingly adjust the basic meter,
and means responsive to changes in a condition of liquid flowing through said meter, for further altering the speed ratio of said transmission and in accordance with such changes.

6. A compensated liquid meter including
a basic meter having a casing, a rotatable shaft and a register,
and compensating means therefor,
said compensating means comprising an adjustable transmission connecting said shaft to said register,
said transmission including a normally stationary gear housing,
means for angularly rotating said gear housing intermittently to modify the indication of said register,
said last means including a first clutch selectively engaging said planetary transmission gear housing,
a second clutch selectively engaging said planetary gear housing,
means for intermittently actuating said clutches in succession,
manually adjustable means for altering the angle of movement of said gear housing by one of said clutches per each actuation thereof to effect adjustment of the basic meter,
and means responsive to a condition of liquid flowing through said meter, for altering the angle of movement of said gear housing per each actuation of the other of said clutches.

7. A compensated liquid meter including
a basic meter having a casing, a rotatable shaft and a register,
and compensating means therefor,
said compensating means comprising a planetary transmission connecting said shaft to said register,
said transmission including a normally stationary gear housing,
means for angularly rotating said gear housing intermittently to modify the indication of said register,
said last means including a first clutch selectively engaging said planetary transmission gear housing,
a second clutch selectively engaging said planetary gear housing,
means for intermittently actuating said clutches in succession,
said means including a cam follower coupled to one of said clutches,
a cam follower coupled to the other of said clutches,
and a cam driven by said rotatable shaft and adapted to successively actuate each of said cam followers.

8. A compensated liquid meter including
a basic meter having a casing, a rotatable shaft and a register,
and compensating means therefor,
said compensating means comprising a planetary transmission connecting said shaft to said register,
said transmission including a normally stationary gear housing,
means for angularly rotating said gear housing intermittently to modify the indication of said register,
said last means including a first clutch selectively engaging said planetary transmission gear housing,
a second clutch selectively engaging said planetary gear housing,
means for intermittently actuating said clutches in succession,
said means including a cam follower coupled to one of said clutches,
a cam follower coupled to the other of said clutches,
and a cam driven by said rotatable shaft and adapted to successively actuate each of said cam followers,
and manually adjustable means for altering the angle of movement of said gear housing by one of said clutches per each rotation of said cam to effect adjustment of the basic meter.

9. A compensated liquid meter including
a basic meter having a casing, a rotatable shaft and a register,
and compensating means therefor,
said compensating means comprising a planetary transmission connecting said shaft to said register,
said transmission including a normally stationary gear housing,
means for angularly rotating said gear housing intermittently to modify the indication of said register,
said last means including a first clutch selectively
engaging said planetary tranmission gear housing,
a second clutch selectively engaging said planetary
gear housing,
means for intermittently actuating said clutches in
succession,
said means including a cam follower coupled to one
of said clutches,
a cam follower coupled to the other of said clutches,
and a cam driven by said rotatable shaft and adapted
to successively actuate each of said cam followers,
and means responsive to changes in a condition of
liquid flowing through said meter, for altering the
angle of movement of said gear housing per each
rotation of said cam.

10. A compensated liquid meter including
a basic meter having a casing, a rotatable shaft and a
register,
and compensating means therefor,
said compensating means comprising a planetary transmission connecting said shaft to said register,
said transmission including a normally stationary gear
housing,
means for angularly rotating said gear housing intermittently to modify the indication of said register,
said last means including a first clutch selectively
engaging said planetary tranmission gear housing,
a second clutch selectively engaging said planetary
gear housing,
means for intermittently actuating said clutches in
succession,
said means including a cam follower coupled to one of
said clutches,
a cam follower coupled to the other of said clutches,
and a cam driven by said rotatable shaft and adapted
to successively actuate each of said cam followers,
manually adjustable means for altering the angle of
movement of said gear housing by one of said
clutches per each rotation of said cam to effect adjustment of the basic meter,
said means being adapted to manually adjust the associated cam follower of said one clutch with respect to said cam,
and means responsive to a condition of liquid flowing
through said meter, for altering the angle of movement of said gear housing per each rotation of said
cam,
said means being adapted to adjust the cam follower
of said other clutch in accordance with changes
in such liquid.

11. A liquid meter including a basic meter having a
casing, a rotatable shaft and a register,
a drive beetween said shaft and register, including a
planetary tranmission having a gear housing capable
of rotation to alter the drive ratio of said planetary
transmission,
a first means for angularly rotating said houing intermittently to change said drive ratio,
and means for increasing or decreasing the angle of
rotation of said housing per angle of rotation thereof by said first means,
a second means for angularly rotating said housing
intermittently to change said drive ratio,
said second means effecting angular rotations of said
housing between angular rotations effected by said
first angular rotating means,
and means for increasing or decreasing the angle of
rotation of said housing per angle of rotation thereof by said second means.

12. A liquid meter including a basic meter having a
casing, a rotatable meter shaft and a register,
a drive between said shaft and register, including a
planetary transmission having a gear housing capable of rotation to alter the drive ratio of said
planetary transmission,
said drive with said gear housing stationary, having a
normal drive ratio outside a desired range of compensation required for changes from standard, in
liquid being metered,
a first means for angularly rotating said housing intermittently to change said drive ratio to an intermediate value within said range,
and manual adjustment means for increasing or decreasing the angle of rotation of said housing per
angle of rotation thereof by said first means to adjust said meter for accuracy,
a second means for angularly rotating said housing
intermittently to change said drive ratio,
said second means effecting angular rotations of said
housing between angular rotations effected by said
first angular rotating means,
and means for increasing or decreasing the angle of
rotation of said housing per angle of rotation thereof by said second means in accordance with departures from a reference standard, of liquid being
metered.

References Cited by the Examiner

UNITED STATES PATENTS

| | | | |
|---|---|---|---|
| 2,438,934 | 4/1498 | Marsh | 73—233 |
| 2,764,901 | 10/1956 | Thoresen | 73—233 |
| 2,884,793 | 5/1959 | Billeter | 73—233 X |
| 2,886,969 | 5/1959 | Dufour | 73—233 |

RICHARD C. QUEISSER, *Primary Examiner.*

ROBERT L. EVANS, *Examiner.*